(12) United States Patent
Nacke et al.

(10) Patent No.: US 8,340,832 B1
(45) Date of Patent: Dec. 25, 2012

(54) ENERGY EFFICIENCY MANAGEMENT SYSTEM AND METHOD

(75) Inventors: Bradford M. Nacke, Westerville, OH (US); Jon VanDonkelaar, Bellbrook, OH (US); Daniel R. Borneo, Corrales, NM (US); Ted Justice, Westerville, OH (US); Mark Eiseman, Lewis Center, OH (US); Andrew Holtom, Westerville, OH (US); Craig E. Kasper, Highland Heights, OH (US)

(73) Assignees: Liebert Corporation, Westerville, OH (US); Sandia Corporation, Albuquerque, NM (US)

( * ) Notice: Subject to any disclaimer, the term of this patent is extended or adjusted under 35 U.S.C. 154(b) by 683 days.

(21) Appl. No.: 12/368,295

(22) Filed: Feb. 9, 2009

Related U.S. Application Data

(60) Provisional application No. 61/027,272, filed on Feb. 8, 2008.

(51) Int. Cl.
*H02J 3/00* (2006.01)
*H02J 3/14* (2006.01)
(52) U.S. Cl. .................. 700/295; 700/286; 705/412
(58) Field of Classification Search .............. 700/286, 700/295–296; 705/63, 412
See application file for complete search history.

(56) References Cited

U.S. PATENT DOCUMENTS

| | | | |
|---|---|---|---|
| 6,178,362 B1 | 1/2001 | Woolard et al. | |
| 6,697,951 B1 | 2/2004 | Sinha et al. | |
| 7,171,287 B2 | 1/2007 | Weiss | |
| 7,248,978 B2 | 7/2007 | Ransom | |
| 7,262,694 B2 | 8/2007 | Olsen et al. | |
| 7,280,893 B2* | 10/2007 | Spool et al. | 700/291 |
| 7,333,880 B2* | 2/2008 | Brewster et al. | 700/286 |
| 7,788,189 B2* | 8/2010 | Budike, Jr. | 705/400 |
| 2004/0162793 A1* | 8/2004 | Scott et al. | 705/412 |
| 2005/0197742 A1* | 9/2005 | Scott et al. | 700/286 |
| 2005/0280528 A1 | 12/2005 | Olsen et al. | |
| 2009/0240381 A1* | 9/2009 | Lane | 700/296 |

* cited by examiner

*Primary Examiner* — John R. Cottingham
*Assistant Examiner* — Douglas Lee
(74) *Attorney, Agent, or Firm* — Standley Law Group LLP

(57) ABSTRACT

Exemplary embodiments of the computerized management system for controlling energy consumption for energy consumers using a smart meter may include a database that contains contract provisions for energy consumers. Furthermore, exemplary embodiments of the system include a database interface adapted to allow the system to access the contract provisions to optimize energy consumption based upon available energy. The system may also include a managing data component that is adapted to manage data between the database and the smart meter. In exemplary embodiments, a communication network connecting the system to the database and the smart meter may be included. Additionally, some exemplary embodiments of the system include a protocol converting component that is adapted to act as an interface for application programming or protocol converting.

4 Claims, 18 Drawing Sheets

Form1

Simulated OASIS Signal

Tier Status: 2   Price Signal: 27.00   Region: 2   [Submit Data]

OASIS Signal Data From Database (OASIS_Signal)

| Oasis_Stat_0 | Tier_Status | Price_Signal | Region | Acknowledge | TimeStamp |
|---|---|---|---|---|---|
| 0 | 2 | 12.0000 | 2 | 4 | 11/5/2007 |
| 436 | 3 | 15.0000 | 1 | 4 | 11/6/2007 |
| 437 | 4 | 1500.0000 | 2 | 4 | 11/6/2007 |
| 438 | 1 | 8.0000 | 1 | 4 | 11/6/2007 |

Smart Meter Data Send (Tier_Query_Selection)

| SM_ID | Price_Signal | Price_Tier_1 | Tier_Status | Region | App_Type | Manufacturer | OPC_Driver | Contract_ID | Critical_Custo | Oasis_Stat_0 | Ack_Code |
|---|---|---|---|---|---|---|---|---|---|---|---|
| SM0004 | 27.0000 | 5.0000 | 2 | 2 | Residential | Nexus | (null) | CTR00001 | No | 578 | Sending |

Smart Meter History (SM_History)

| SMH_OID | Contracr_ID | SM_ID | OASIS_Stat_ | Tier_Status | Price_Signal | USAGE_KW | TimeStamp |
|---|---|---|---|---|---|---|---|

FIG-3

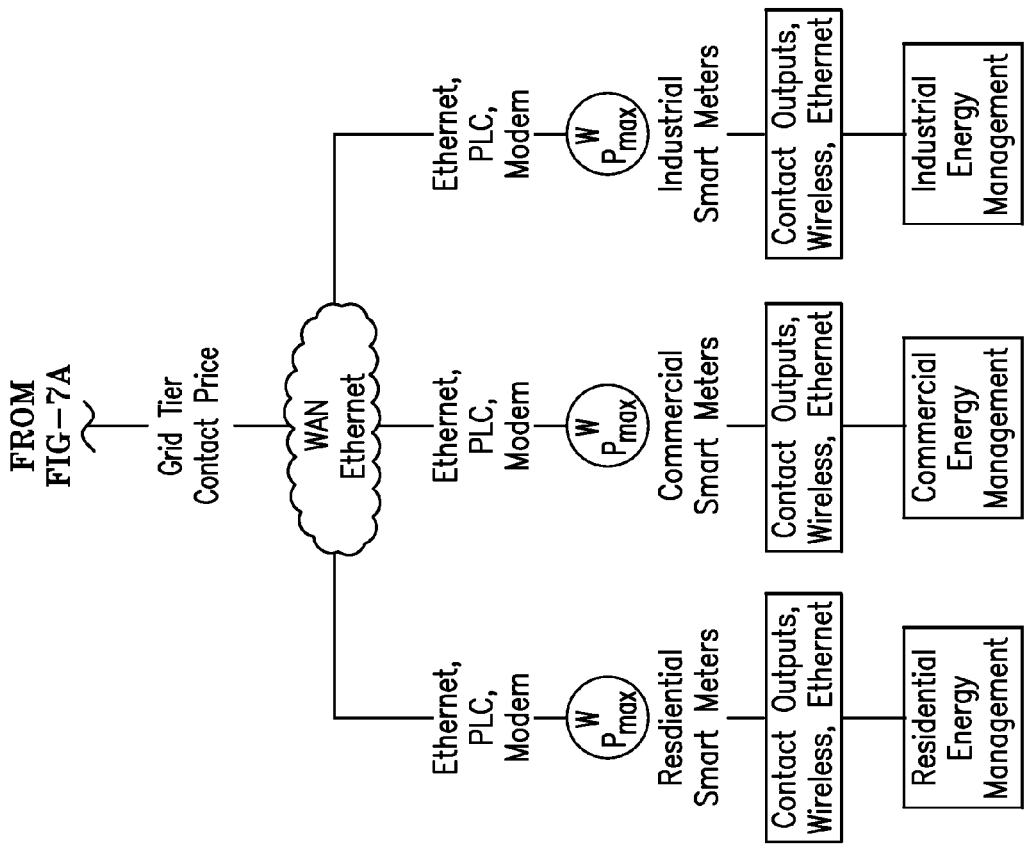
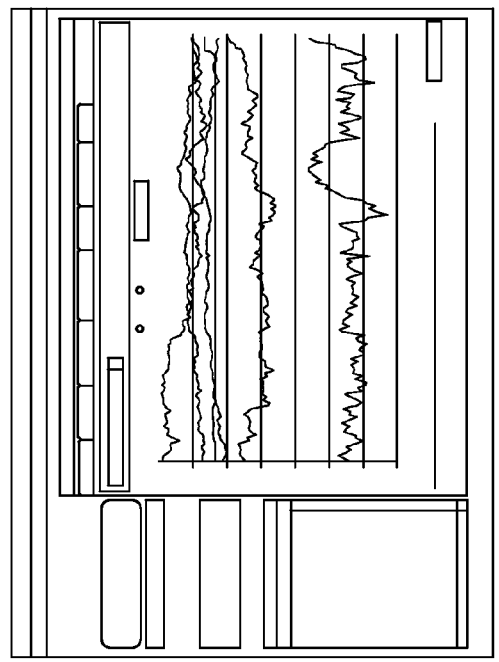
FIG-7B

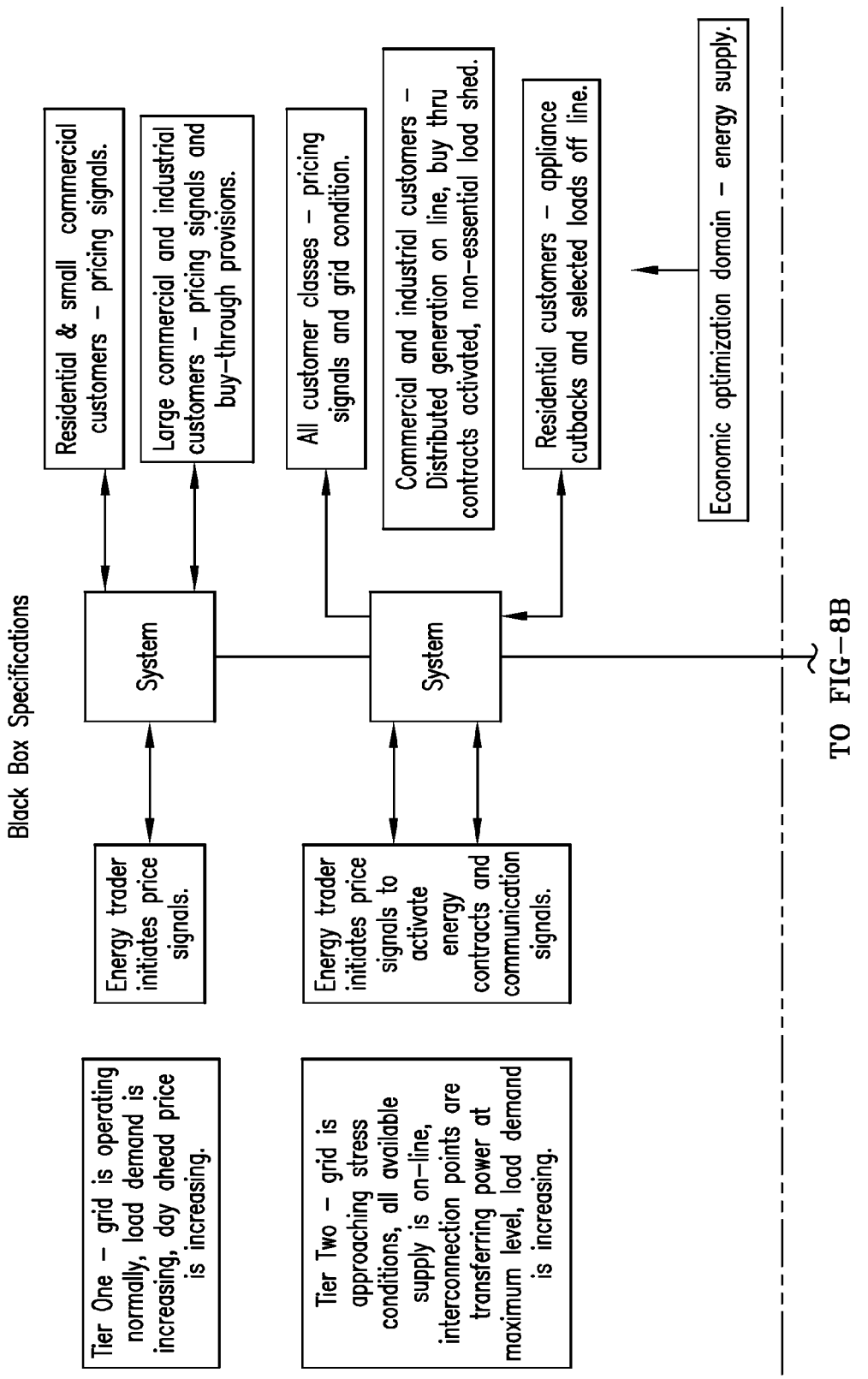

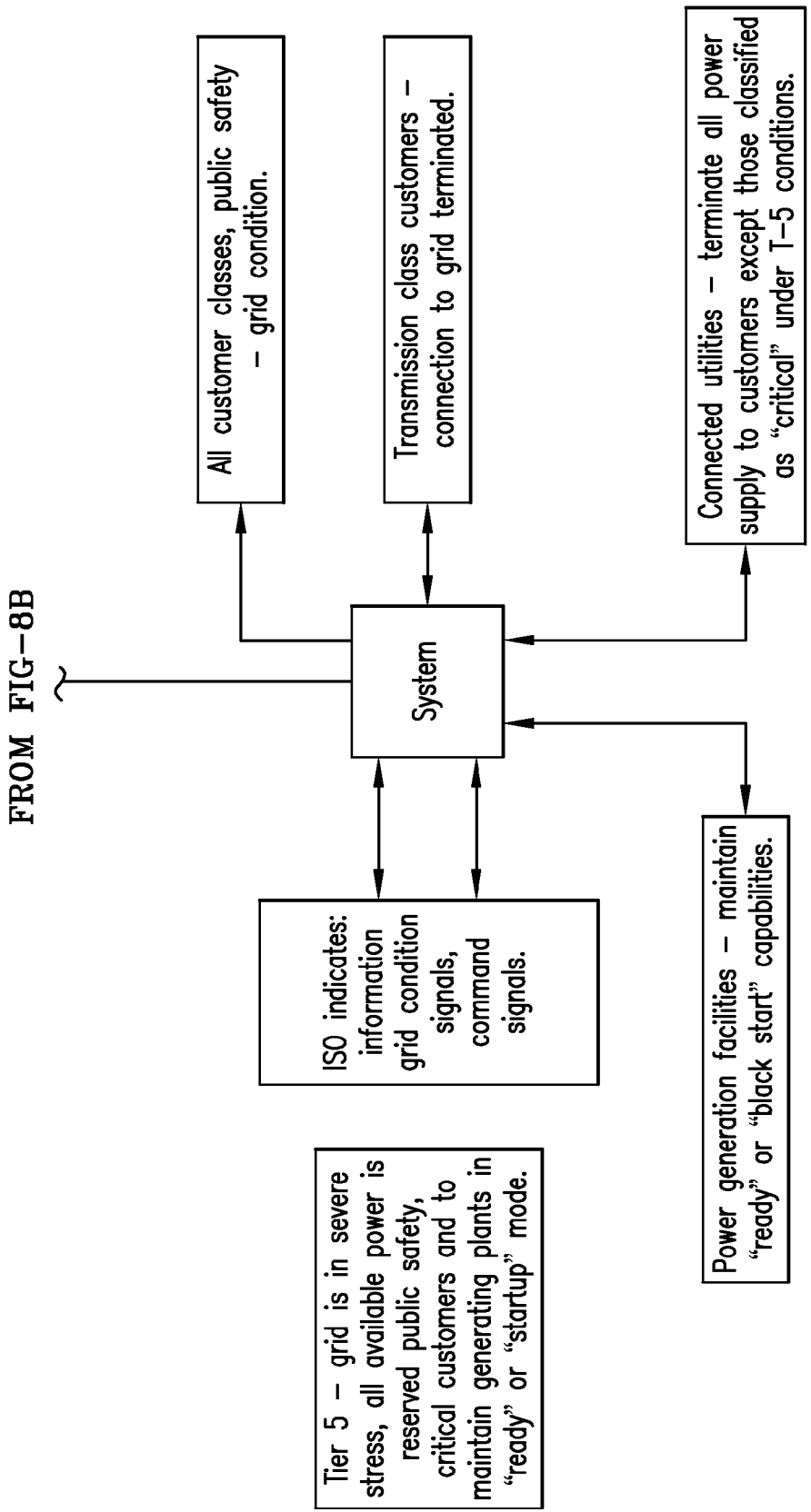

ENERGY EFFICIENCY MANAGEMENT SYSTEM AND METHOD

CROSS-REFERENCE TO RELATED APPLICATIONS

This application is a non-provisional of U.S. provisional patent application 61/027,272, filed Feb. 8, 2008, which is incorporated by reference as if fully recited herein.

INVENTIVE FIELD

Exemplary embodiments of the present invention are directed to an energy efficiency management system and method. More particularly, exemplary embodiments of the present invention are directed to an energy efficiency management system and method that controls energy consumption for energy consumers that use an energy management device capable of controlling the flow of energy based on commands.

BACKGROUND

As the economy and population of the United States and world continually increases, there is a corresponding increase in energy consumption by people and populations. An increasing amount of problems arise when governments and/or companies try to expand and efficiently manage power consumption to meet load growth using known solutions. Grid congestion is one of the many major problems with managing power consumption.

Therefore, many efforts are ongoing to develop hardware, software, and logistical solutions that allow a divergence from known solutions and a convergence toward integrating distributed generation (DG) technologies into a modern, intelligent grid. One aspect of this effort is modeling. Grid modeling historically revolved around two key aspects, supply side distribution and pricing schemes. As the grid ages and demand increases, the grid approaches full capacity. Known solutions of adding traditional coal and natural gas generators may have an adverse effect on the environment by producing greenhouse gas emissions. Additionally, as was demonstrated the northeast blackout that occurred in 2004, a grid cannot necessarily tolerate major disruptions from one area to another. If the grid crashes in one area, there is a finite probability that it will take down other sections of the grid potentially leaving millions of customers without power. In order to improve local reliability and reduce customer risk, more and more DG is being installed. This has increased the need for load side (or demand side) modeling and evaluation.

Currently, electric power transmission is regulated on the Open Access Same-Time Information System ("OASIS"). OASIS originated as a result from the Energy Policy Acts (EPAct) of 1992 and 2005. EPAct 2005 expands the provisions governing reliability of the bulk power system with focus on expanding and modernizing the national electrical grid. The Federal Energy Regulatory Commission (FERC) Order 888 opens wholesale power sales to competition through the use of tariffs describing the terms and conditions of service. FERC Order 889 describes the implementation of OASIS as an internet-based system that allows consumers and suppliers a medium for obtaining and supplying electric power transmission throughout North America governed by the transmission service business practices and Standard of Conduct adopted by FERC.

Many times, centralization of the transmission grid status is falling more into the realm of the OASIS nodes. The Transmission Services Information Network (TSIN) has been developed within the framework of OASIS and uses the standards set forth in the North American Electric Reliability Corporation (NERC) Interchange Transaction Tagging protocols. Registration of transmission product attribute values, including Points of Delivery and Points of Receipt are monitored in real-time using this system.

OASIS operates by using a number of web-based interfaces named "nodes" that transmit the system's market offerings and availability announcements. Nodes, which are generally regional, within OASIS are collective bulk transmission systems or Independent System Operators. Each node administers and monitors the grid load and pricing. The difference in capacity needed to serve the native load and safe flow buffers are made available for purchase on the OASIS node. Essentially, a buyer may purchase power during a certain time period to transfer to their portion of a grid for use at a price determined by a supplier.

OASIS acts as an open market for trading electric service supply and demand. Many of the nodes, house auction-like transactions where suppliers and buyers are vying for positions or "seats" on grid systems for time-based durations. Typically, these transactions are incremental and increase in priority and expense; hourly, daily, weekly, monthly, etc. on up to "firm" transactions which have the highest priorities and are the last to be curtailed. Priorities are placed on the type of grid transmission determined in the transaction.

OASIS restricts public access to energy traders (ET) that become signatories to a transmission provider's open-access transmission tariff (OATT) and market observers. The ETs are granted access to viewing real-time prices, services, and transmission availability along with requesting services throughout a node, while market observers are restricted to a "read only" version.

The OASIS Communication Standards and Protocols Document is the data dictionary for the system. The document provides the data structures, nomenclatures, and standardized objects that are accessible programmatically to each node. The programmatic "hooks" allow for the seamless passing of data, such as pricing signals, in a real-time environment. Realistically, all of the nodes do not implement all of the real-time functionality that OASIS is capable of producing. Some nodes, such as PJM Interconnection, provide interactive websites that allow for real-time observations of the market within their node. While others, merely have links with contact information and maps of providers with forecasted prices for transactions based on transmission type.

Within OASIS, Local Distribution Companies (LDC) may maintain customer record databases. Typically, there are no industry standards for the LDCs customer record databases. Most LDCs employ proprietary enterprise-wide databases that are specifically designed for their business model and are powerful, flexible, and built on standardized database platforms Common enterprise database platforms are Oracle, Sybase, SQL, SAP, and IBM platforms. Because most of the databases are built on common platforms, data connection capabilities are accommodated in the database.

Consequently, it can be understood that there is a need for an energy efficiency management system and method. Further, there is a need for an energy an energy efficiency management system and method that controls energy consumption for energy consumers that use one or more smart meters. Additionally, exemplary embodiments of the system and method may use the pricing signals from the OASIS system to form a feedback loop between customer load and energy provider generation. Further, a system and method is desired that may provide and orderly way of dispatching both load and generation in order to keep a grid stable and functioning. Also, it is preferred that the system and method gives customers a choice when to have their electric devices connected to the grid based on energy costs. The system and method may enable a customer to obtain maximum overall value from any local energy assets that the customers possess.

SUMMARY

Exemplary embodiments of the computerized management system for controlling energy consumption for energy consumers using a smart meter may include a database that contains contract provisions for energy consumers. Furthermore, exemplary embodiments of the system include a database interface adapted to allow the system to access the contract provisions to optimize energy consumption based upon available energy. The system may also include a managing data component that is adapted to manage data between the database and the smart meter. In exemplary embodiments, a communication network connecting the system to the database and the smart meter may be included. Additionally, some exemplary embodiments of the system include a protocol converting component that is adapted to act as an interface for application programming or protocol converting.

Some exemplary embodiments of the system may take information from the utility and convert it to action. The action depends on the input signal and the customer's pre-established criteria for maintaining power from the Local Distribution Company provider. The system may be a tool owned and used by the utility or Independent System Operator, which would have the capability to shed customer load and allow distributed generation to come on line, thus keeping the utility-supplied power closer to normal operating specifications. Some embodiments may reduce the stress on the grid and makes it less likely for grid overload conditions which can cause sustained power outages. The system may communicate with smart meters and other controllable devices, telling the smart meters when to switch on or off, or when to change settings (air conditioner set points, e.g.)

The United States electric grid may benefit from the inclusion of distributed generation and closed loop control. In some exemplary embodiments, pricing signals from the ISO OASIS system may be used to form a feedback loop between customer load and energy provider generation. Exemplary embodiments of the system may provide an orderly method of dispatching both load and generation in order to keep the grid stable and functioning by giving customers a choice as to when to have their electric devices connected to the grid based on what it will cost them. Furthermore, some embodiments of the system and method may give customers a mechanism to obtain maximum value from any local energy generation assets that they might have at their disposal.

Although exemplary embodiments of the system are repeatedly mentioned to be used in conjunction with the ISO OASIS system and other utility grids, other exemplary embodiments of the system may be used in conjunction with other systems that monitor and control electric grid technology. For example, the system may be used in a micro-grid situation where the power distribution grid is a discrete customer, such as a university or large corporation campus that consists of multiple buildings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 3 illustrates an example of a screenshot from the OASIS Signal Simulation Screen of an exemplary embodiment of the system;

DETAILED DESCRIPTION OF EXEMPLARY EMBODIMENT(S)

Figure 1:
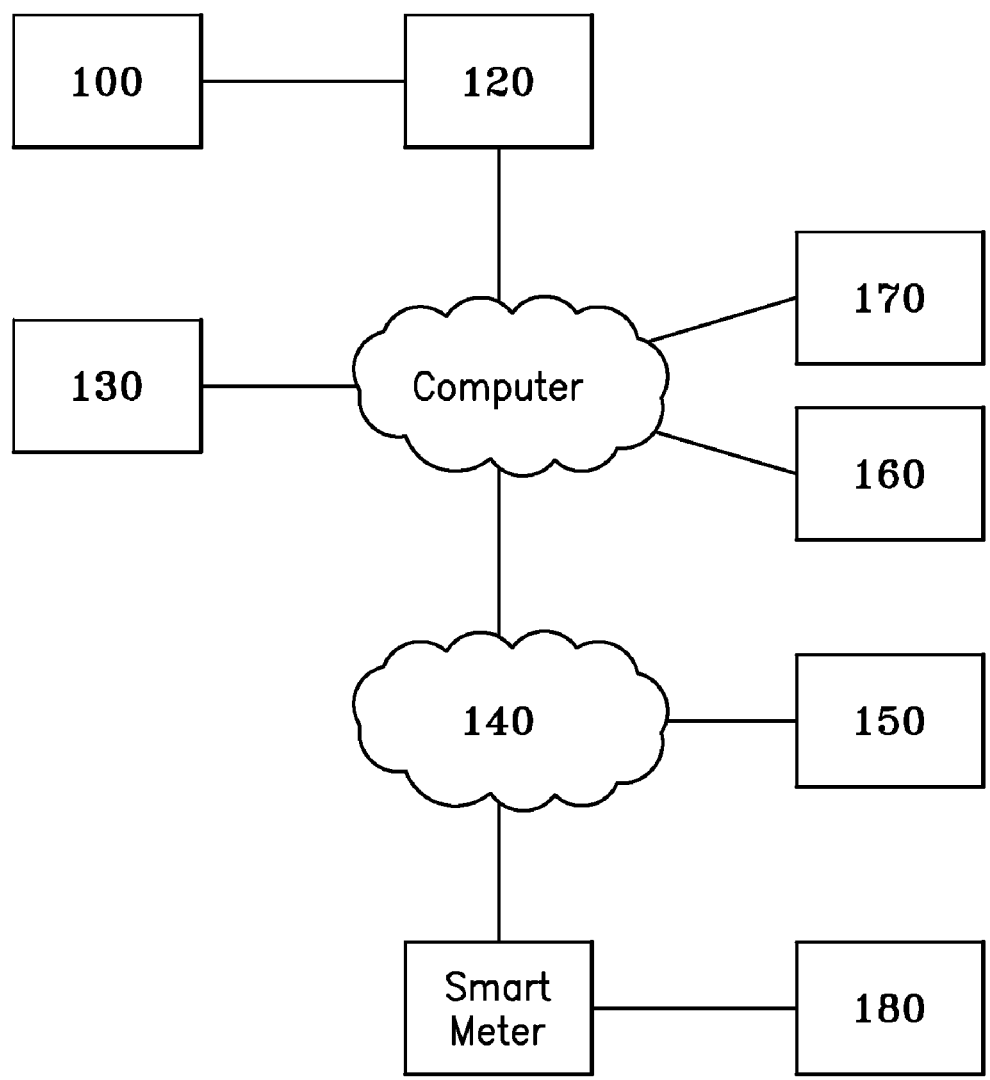
FIG. 1 is a block diagram of an exemplary embodiment of the system.

As seen in FIG. 1, exemplary embodiments of the computerized management system 10 (hereinafter "system") for controlling energy consumption for energy consumers using a smart meter may include a database 100 that contains contract provisions for energy consumers.

In whatever form, exemplary embodiments of the system 10 may use a computer to perform processing functions. In one exemplary embodiment, the computer components used in the system 10 may be self equipment that is readily available. A compute with a larger screen size may be used to accommodate viewing several data forms at the same time and to allow viewing form a greater distance during use.

In some exemplary embodiments, the system 10 may send and receive data signals from smart meters. A smart meter in this application may be any number of energy management devices capable of controlling the flow of energy based on commands from the system 10. Although most smart meters use standard physical communication protocol, the information transmitted across the media may be somewhat proprietary. Many meter manufacturers comply with open communication protocols but with so many competing "open" standards, the net effect is much like a proprietary protocol for each manufacturer. Many open communication protocols are backed by large manufacturers with vested interest in promoting a particular standard. This all but ensures that a manufacture's meter data management software must be used. Regardless of the information protocol there are definable physical connection methods and information carrying protocols in use in the industry today. In some exemplary embodiments, these common definable physical connection methods and information carrying methods include, but are not limited to: TCP/IP, Ethernet, DSL/Cable High Speed Connections, Radio Frequency Networks, both proprietary and open, Satellite Networks, Modems, Both Cellular and Dial-Up, and PLC, Power Line Carrier.

Typically, smart meters used in conjunction with exemplary embodiments of the system and method would be a combination of these different technologies to fit each meter application. Rural areas would not have the same communication backbone options that are available in urban areas.

Data polling rates will differ between customer types as well. This polling rate will be a major factor in determining a communication scheme. In one example, TCP/IP, Ethernet was used, as a majority of computers support this standard and most meter manufacturers offer some connectivity to this media.

Many times, there may be differences between residential and industrial smart meters. Typically, residential smart meters are low cost units suitable for mass deployment. Normally, these meters have the ability to display or pass data important to the residential consumer but not as extensive as the information that an industrial customer would desire. On average, industrial smart meters are generally more expensive and have much greater control capabilities than their residential counterparts. Usually, curtailment of energy consumption in industrial applications has a much greater payback to the client than residential applications. Thus manufacturers of industrial meters tend to pack them with extensive configuration and information tools. Generally, commercial applications have elements of both residential and industrial applications. In some exemplary embodiments, there are small applications with minimal loads and others are large office complexes. However, using exemplary embodiments of the system and method, the possibility of self-generated or co-generated power exists in all three applications.

Several different companies manufacture smart meters. In some exemplary embodiments, the following smart meters may be used within the system and method, and include, but are not limited to: Echelon Meters, Schneider (Square D) Meters, Emerson, GE, Trilliant, and Itron.

In one example, the system may be used in conjunction with one or more Power Measurement ION 7600 Smart Meters. In another example, an Electro-Industries NEXUS line of smart meters may be used as a residential meter. In one example, a NEXUS 1250 meter may be used. Some of the general specifications for the NEXUS 1250 include, but are not limited to: 3 Phase 120/240 volt, Custom User Mapped Modbus Registers, Modbus/TCP communication options, and 4 contact external relay modules.

In certain embodiments, the database 100 may contain information that at least includes, but is not limited to: OASIS [Open Access Same Time Information System] energy price signals, local distribution company customer records, meter identification for customer location, or transmission grid status information systems.

In exemplary embodiments, the data structure of the database 100 may be minimized to the essential data required to support the functionality as previously described. Any type of database 100 may be used that allows the system 10 to operate properly. The database 100 may contain other data related to the system and method, depending on the design criteria and other specifications.

In one exemplary embodiment, the database 100 used may be Microsoft SQL Server 2005, which is a comprehensive, integrated data management and analysis software package that enables organizations to reliably manage mission-critical information and confidently run today's increasingly complex business applications. SQL Server 2005 may allow companies to gain greater insight from their business information and achieve faster results for a competitive advantage, when compared with other databases available. However, many other types of databases may be used.

Many times, SQL Server databases are becoming more of a standard within large database management implementations due to the flexibility and interoperability potential. Large companies, as well as medium-sized companies, are more likely to choose SQL Server over other database structures because it may reduce the cost of producing software, implementation, and management. Because of this, one exemplary embodiment may use a SQL Server 2005 as the backbone to the database 100 for the system.

In another exemplary embodiment, database schema design and development may be achieved using Microsoft SQL Server Management Studio. Because the architecture is the same, enterprise grade tools for development may be used for the design and development of the database schema. SQL Server Management Studio provides the platform for SQL scripting, query building, and custom programming. All of the Tier logic may be built using the SQL Server Management Studio using stored procedures, queries, triggers, and table definitions.

Exemplary embodiments of the system 10 include a database interface 120 adapted to allow the system 10 to access the contract provisions to optimize energy consumption based upon available energy. In one exemplary embodiment, the system 10 may use a combination of the database 100 along with manufacturer specific configuration and meter data management software. In some exemplary embodiments, it is preferred that the smart meter used with the data interface 120 has some of the following criteria: a common communication backbone (TCP/IP Ethernet or a combination of TCP/IP and PLC or RF); should be capable of being customized to demonstrate functionality of different customer needs; the meter configuration software should be capable of exchanging data with other databases and software using common data exchange methods; the meter should allow for control of some external device to demonstrate automatic load curtailment; the meter should allow for constant or timed polling; and the meter should allow for bi-directional power reading to allow for co-generation measurement.

Exemplary embodiments of the system 10 include a data management component 130 for managing data between the database 100 and a smart meter. In some embodiments, the data management component 130 may be a software product. In one particular example, FactoryTalk Transaction Manager may be the software product that is used to handle moving data between the database 100 and the smart meter.

In another exemplary embodiment, Kepware may be used. Kepware is an industrial protocol conversion software package designed to act as conversion tool between device protocol and object-linking and embedding for process control compliant software. This software may act as the translator between the database interface 120 and a smart meter in the system 10.

A communication network 140 connecting the system 10 to the database 100 and the smart meter may be included in some exemplary embodiments. In some exemplary embodiments, the communication network 140 may be at least hardwire, wireless, or internet-based, and include, but are not limited to the following examples: TCP/IP, Ethernet, DSL/Cable High Speed Connections, Radio Frequency Networks, both proprietary and open, Satellite Networks, Modems, Both Cellular and Dial-Up, and PLC, Power Line Carrier.

In some exemplary embodiments, a network security system 150 may be adapted to secure the communication network 140. Any form of a network security system 150 may be used that would assure secured transfer of information through the communication network 140. Typically, there are required security and regulatory standards in the utility setting that must be followed. Exemplary embodiments of the network security system 150 will meet or exceed these security and regulatory standards. Also, in other micro-grid applications, the network security system 150 may be secured to whatever level the user may desire.

Some exemplary embodiments of the system 10 may include a protocol converting component 160 adapted to act as an interface for application programming or protocol converting. Any form of protocol converting component may be used, depending on the design aspects of the system 10.

Normally, software for meter configuration and identification is manufacturer specific. Data connections to Local Distribution Company customer location databases are typically through common data exchange methods such as Open Database Connectivity or Extensible Markup Language. In one example of the system 10, the meter and software may allow for custom configuration of internal registers and programs. Also, in some examples, the meter may allow for real-time updates to the internal programming.

In one exemplary embodiment, application of a system 10 uses a combination of technologies and software that communicate via common data exchange methods. Many manufacturers offer complete solutions for load curtailment, billing, and meter configuration, but all are proprietary in implementation and require using a specific manufacturer's solutions, services, and meters. In one exemplary embodiment of the system, software readily available from the manufacturers of various meters is used.

A geographic interface system 170 that uses spatial analysis may be included in some exemplary embodiments of the system 10. In some particular embodiments, the geographic interface system is adapted to track at least customer energy usage, customer energy capabilities, or customer marketing. The electrical transmission industry may prefer geographic interface system-based transmission grid status databases because they may take advantage of the spatial analysis capabilities for tracking usage, grid system conditions, distribution, and marketing. In one exemplary embodiment, the system 10 is designed to work with geographic interface system data that easily accommodates the spatial locating of meters.

In some exemplary embodiments, the system 10 may include an interface 180 adapted to communicate energy management systems for control of energy consumption. Many times in the utility setting, certain customers have energy management systems (EMS) for control of electric power within their facility or enterprise. The EMS is "downstream" or after the "smart meter". Exemplary embodiments of the system 10 may send commands to these smart meters and an interface 180 located between the smart meter and the EMS may execute these demands.

Figure 2:
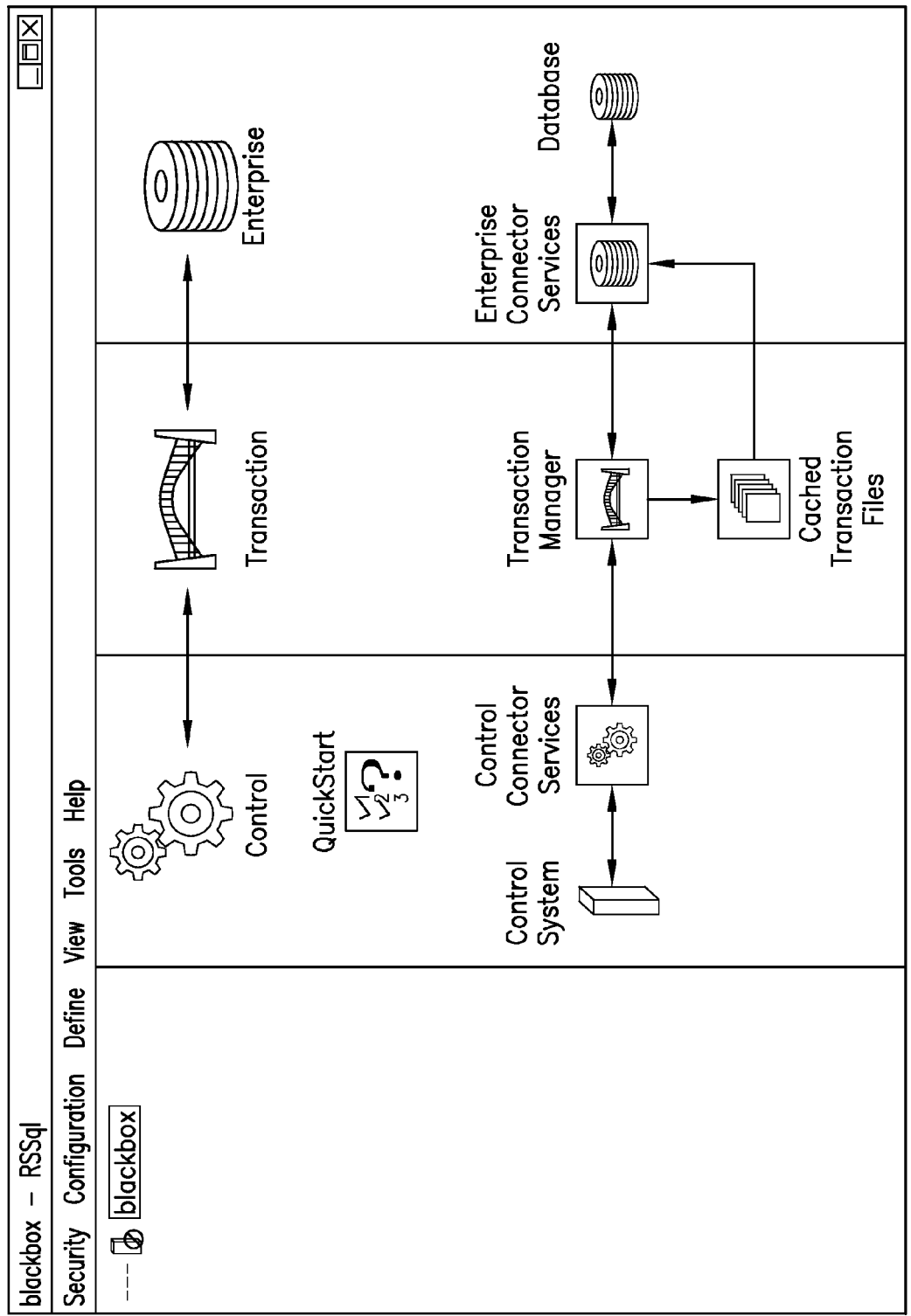
FIG. 2 illustrates an example of a screenshot from the SQL Database Setup Screen of an exemplary embodiment of the system.
Figure 4A:
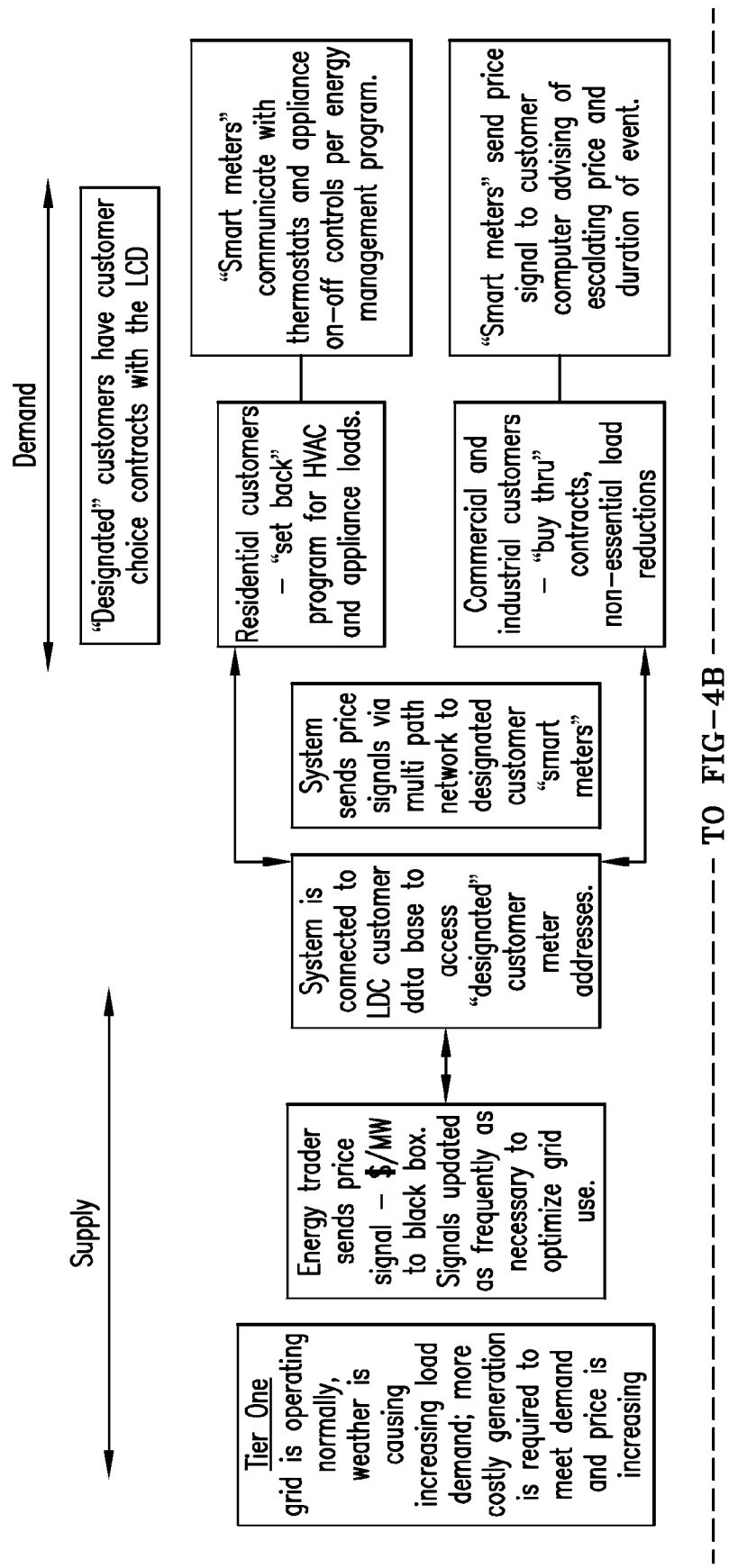
FIG. 4 illustrates a schematic diagram illustrated of one exemplary embodiment of the system where five different energy levels are used.
Figure 4B:
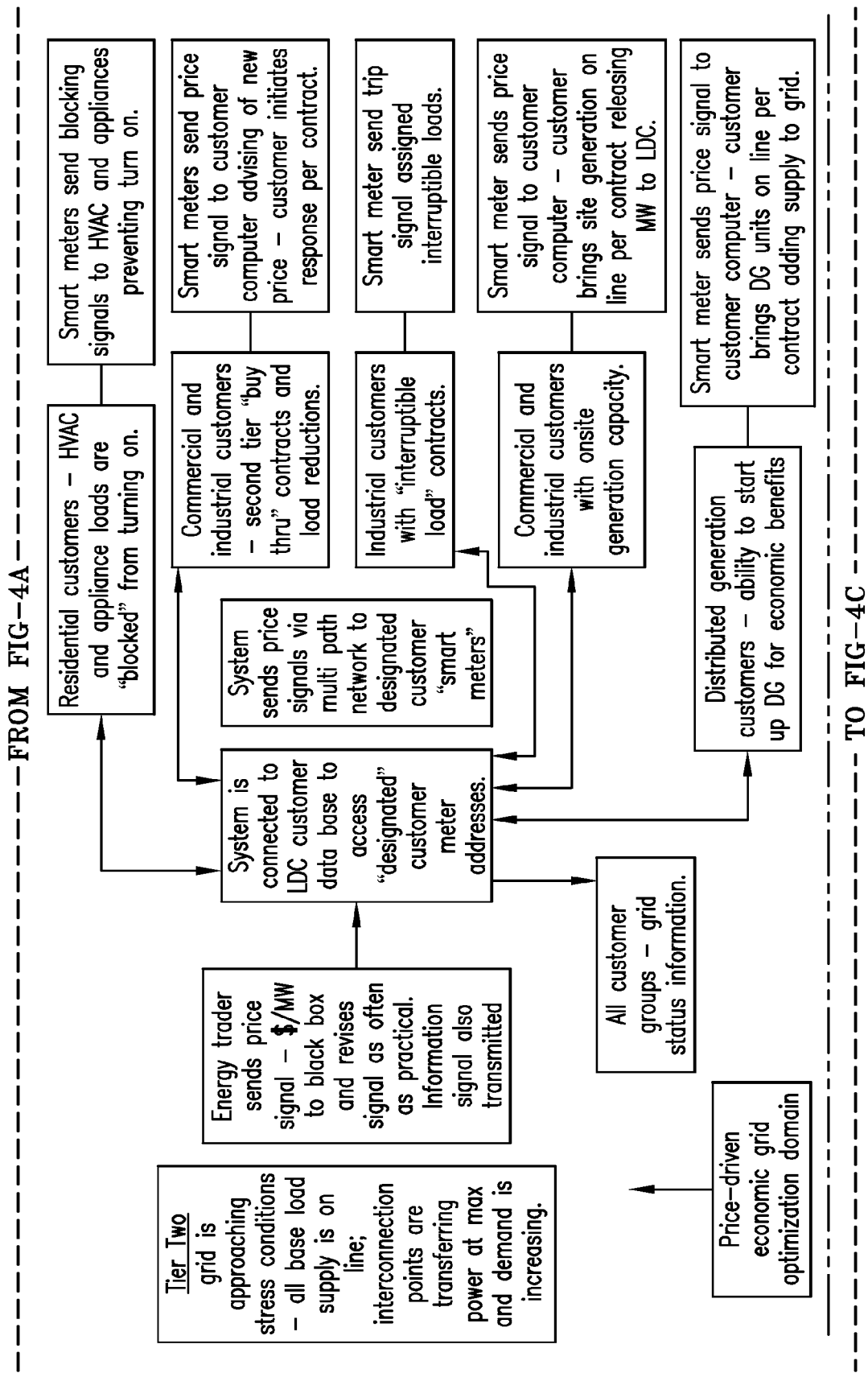
Figure 4C:
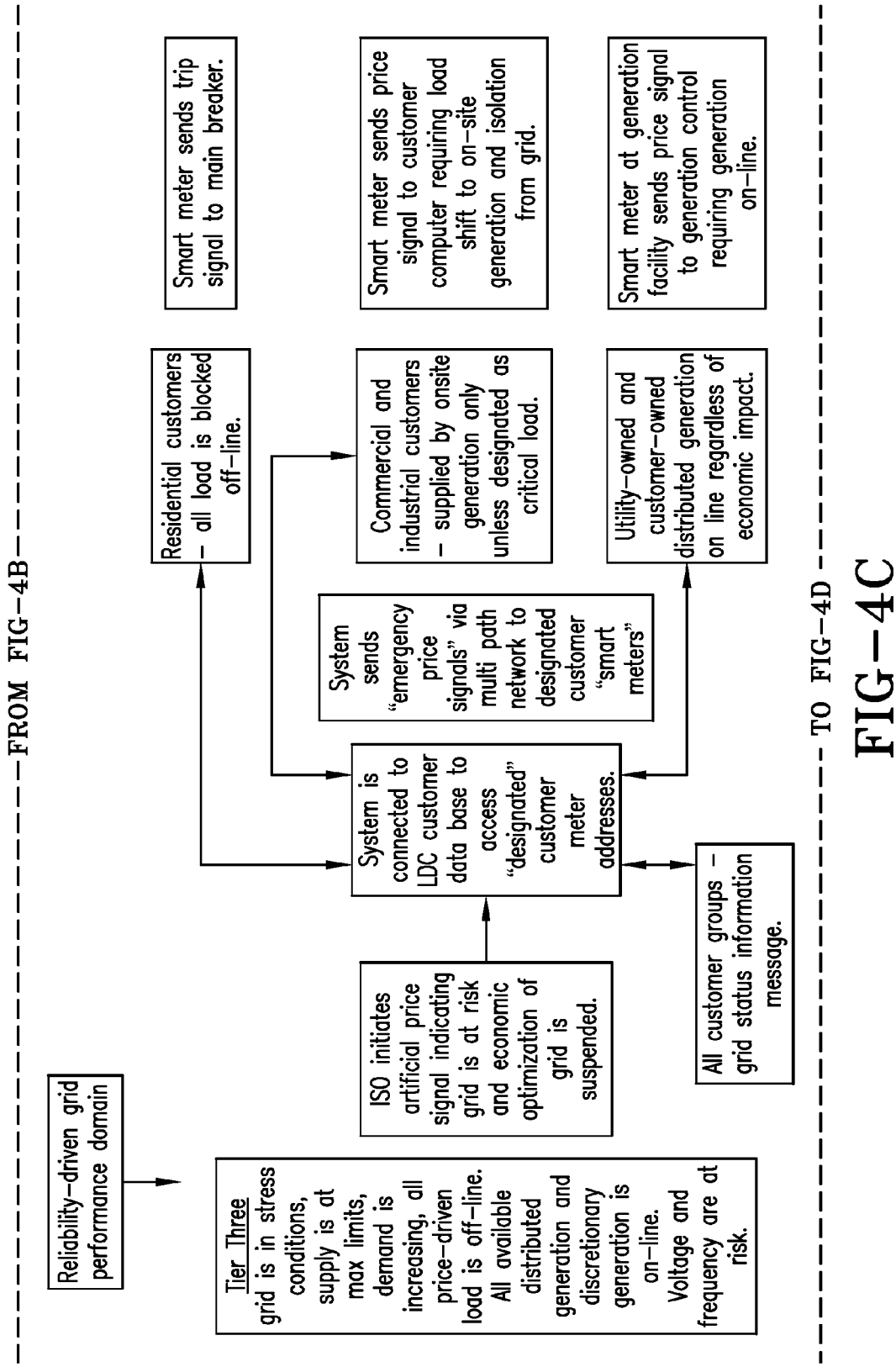
Figure 4D:
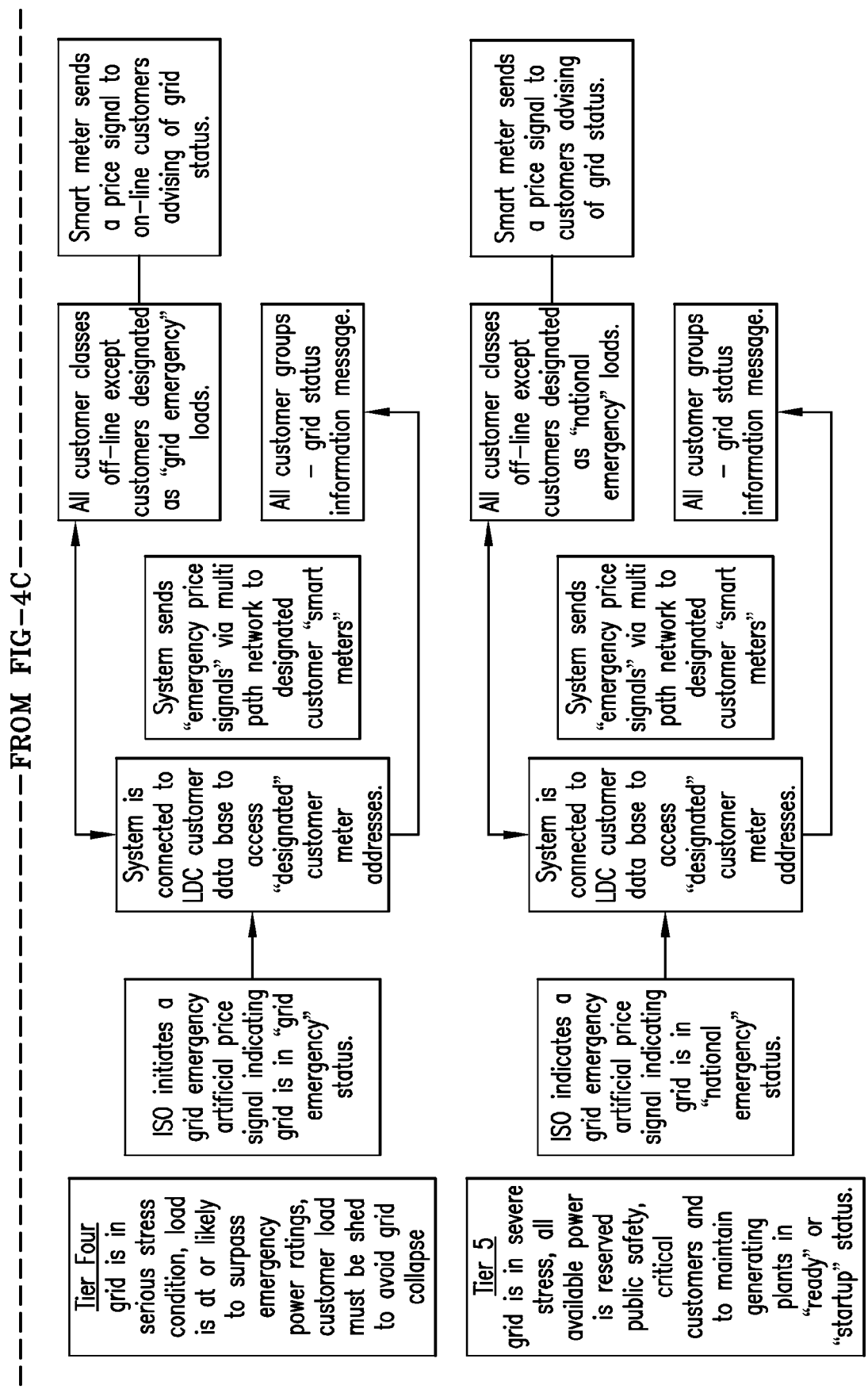
Figure 5A:
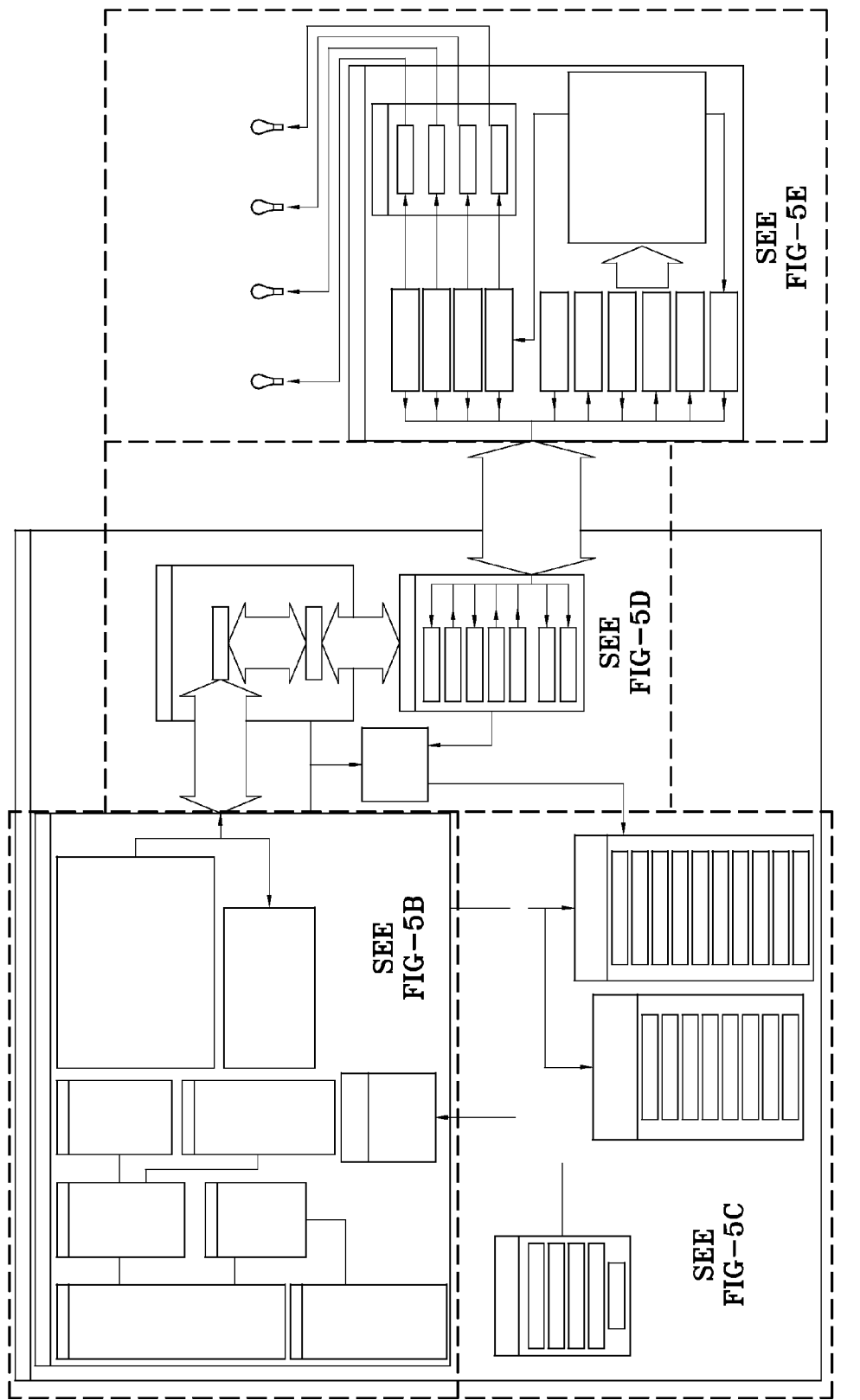
FIG. 5 illustrates one exemplary embodiment of the test block diagram used to test the system using five different energy consumption levels.
Figure 5B:
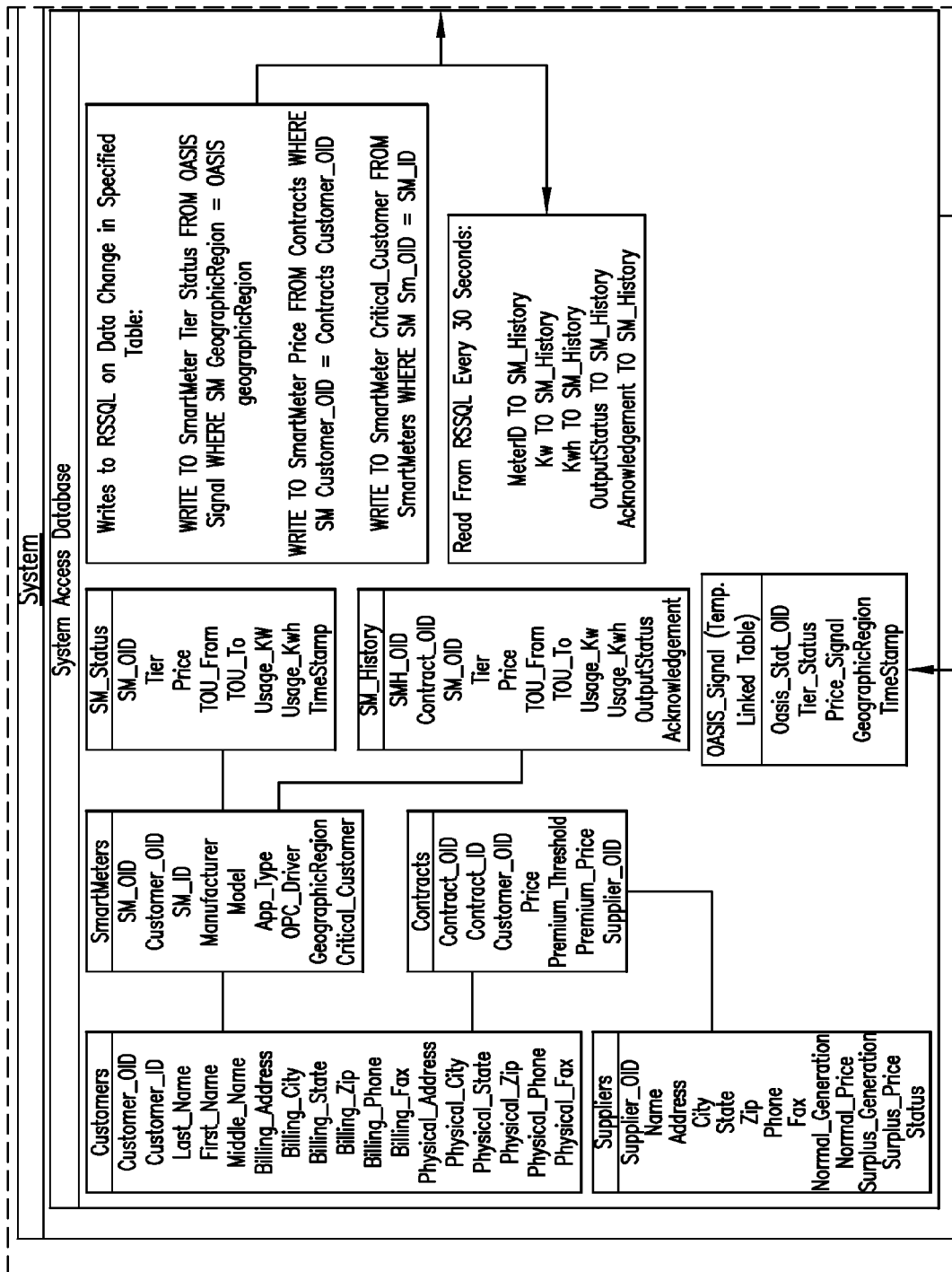
Figure 5C:
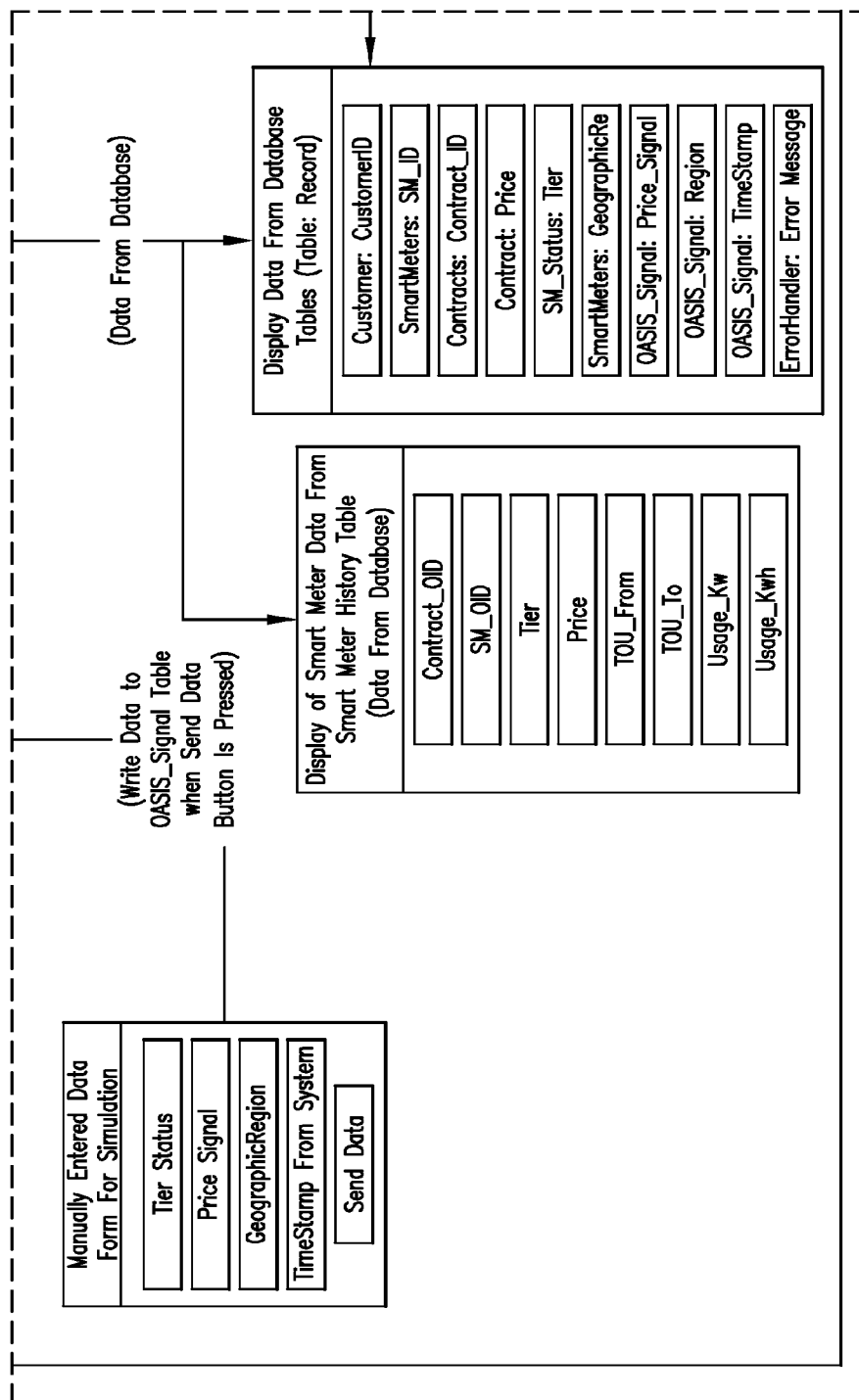
Figure 5D:
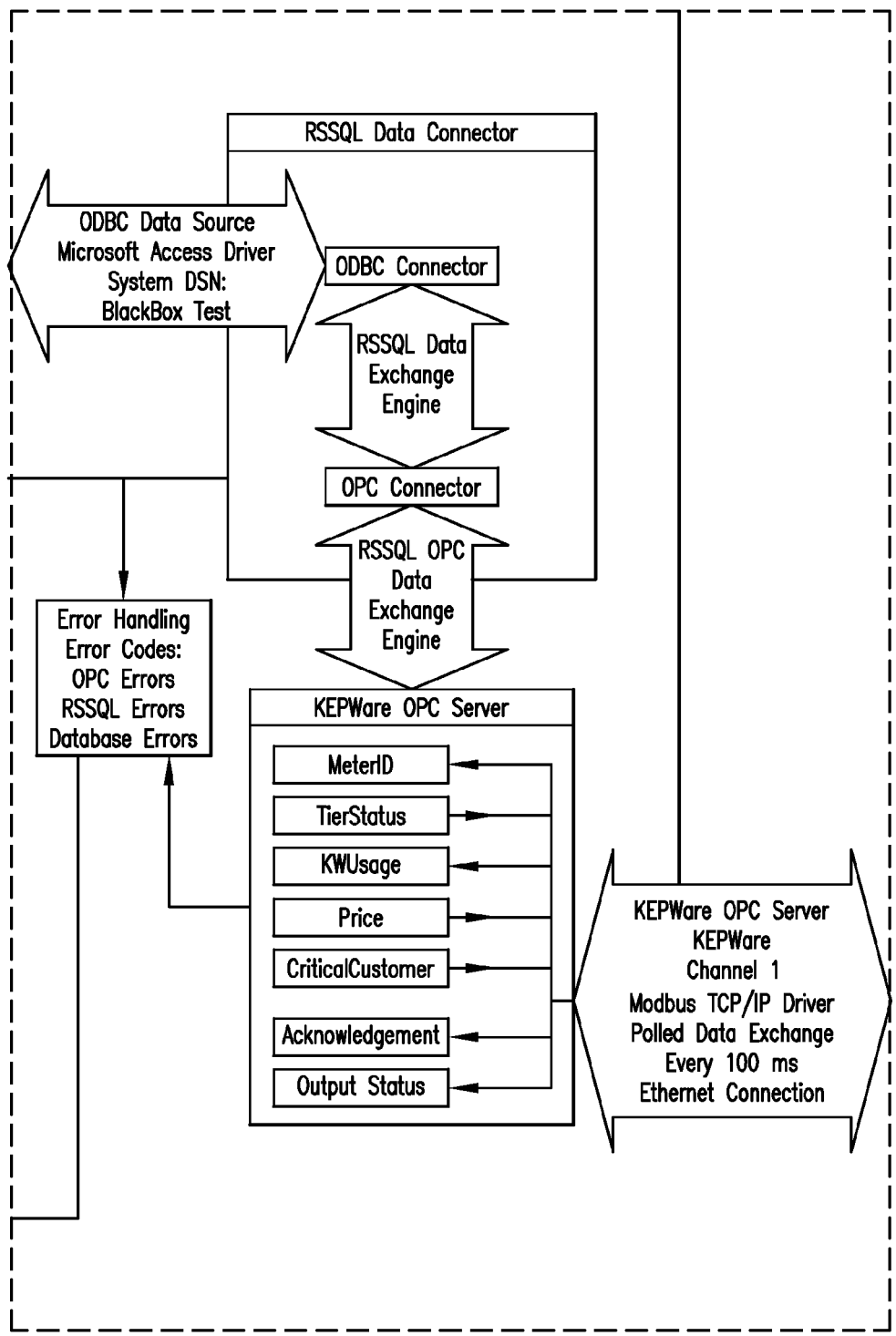
Figure 5E:
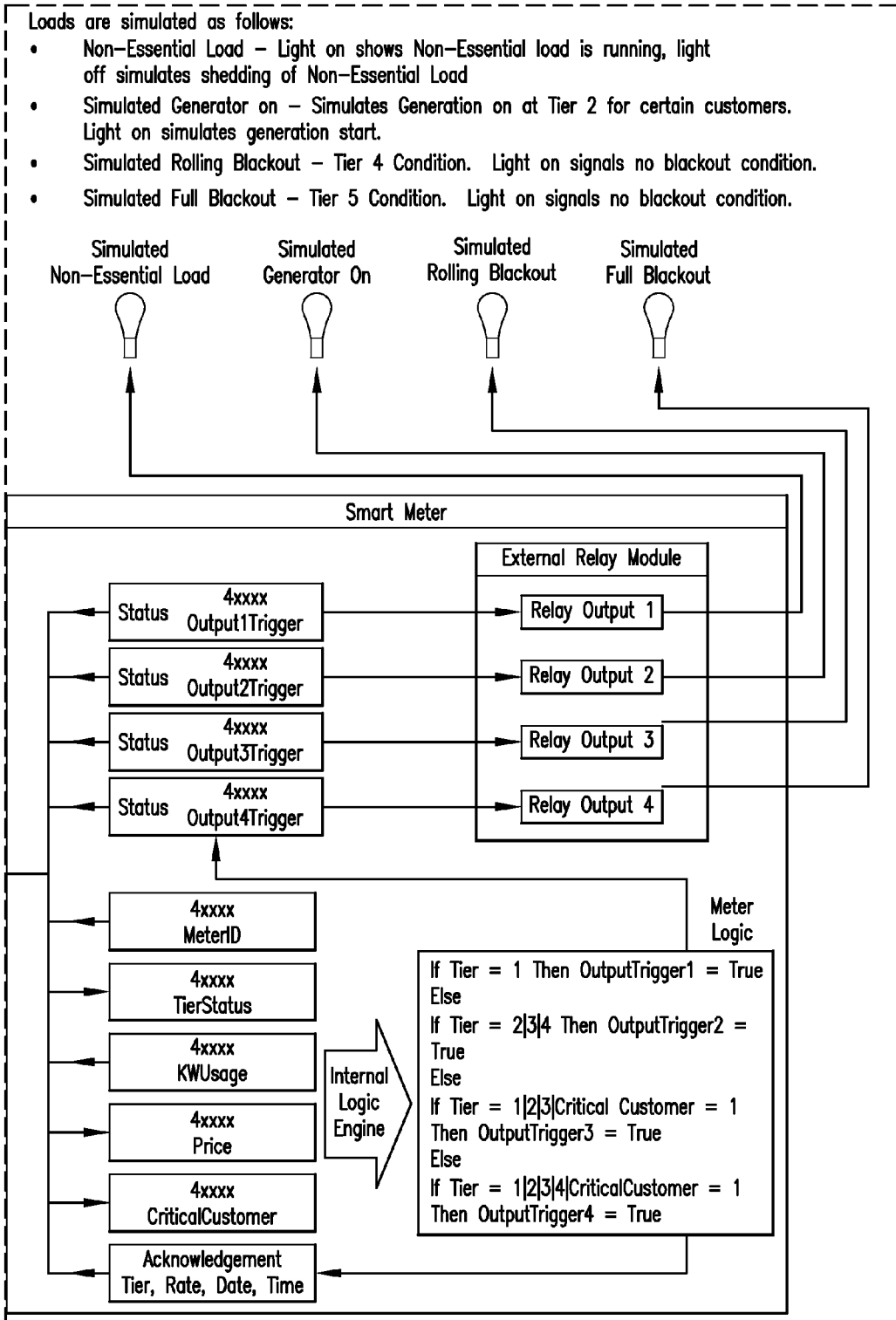

In one example, display screens may be used to allow data entry and data verification. FIG. 2 illustrates an example of a screenshot from the SQL Database Setup Screen. Additionally, FIG. 3 illustrates an example of a screenshot from the OASIS Signal Simulation Screen. In another example, one screen allows region, pricing and tier status entry, and data monitoring. The display screens allow for verification of data entered and display of smart meter status and feedback.

Typically, each Local Distribution Company and Independent System Operator monitors grid status in order to protect their equipment. In one example, OASIS is used to monitor grid status in a macro manner. In another example, geographic information system monitors grid status. Also, in one exemplary embodiment, the system 10 is based on five grid status levels and uses geographic information systems.

The schematic diagram illustrated in FIG. 4 is one exemplary embodiment of the system where five different energy levels are used. This exemplary embodiment is suitable to demonstrate the range of activities described in the schematic diagram. Furthermore, an outline is attached as Addendum A to provide one example of how the system 10 may operate when the system 10 uses five different energy consumption levels. Additionally, FIG. 5 illustrates one exemplary embodiment of the test block diagram used to test the system using five different energy consumption levels (tiers). Although this particular system 10 uses five different energy consumption levels, any number of levels may be used, depending on the design criteria and application of the system 10.

Figure 6:
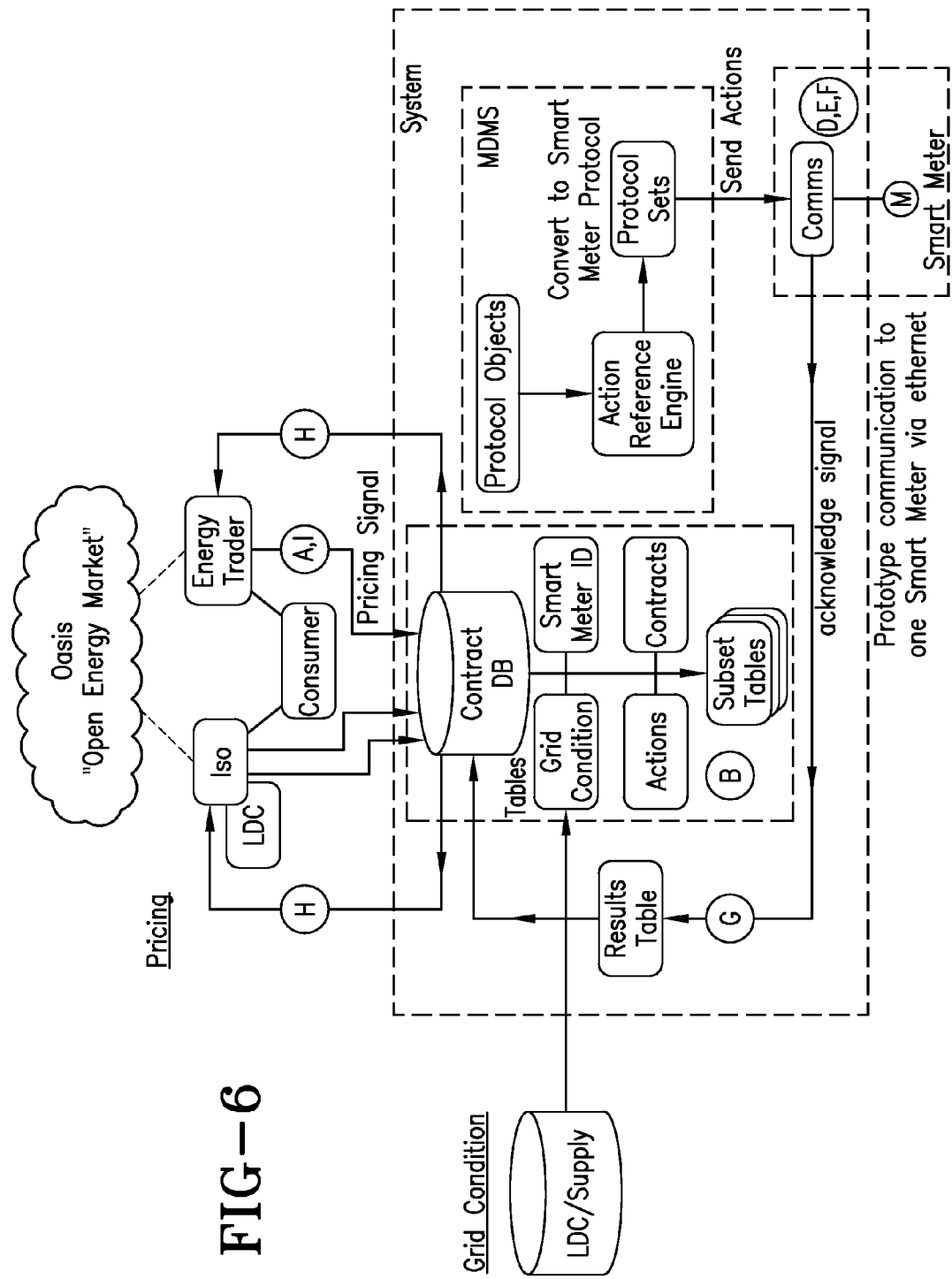
FIG. 6 illustrates a schematic of one example of the pricing signal flow of an exemplary embodiment of the system.

FIG. 6 illustrates a schematic of one example of the pricing signal flow of the system 10. The letters in the circles in FIG. 6 represent each of the corresponding major points in the software and hardware outline attached as Addendum B. The outline contained in Addendum B includes the functions that may be contained in one exemplary embodiment of the system 10.

In one example, the customer for the system 10 may be the de-regulated and regulated sides of the corporate utility. The code of conduct between these two sides may be recognized and included in the functions of the system 10. Typically, the system 10 provides a shared benefit between the utility and the electricity consumer. The utility gets the potential to ease grid stress and keep a more robust grid in operation while the electricity consumer gets the opportunity for customer choice by deciding whether or not to purchase power at the higher process, in one particular example, in the first two tiers. In this particular example, after Tier 2, load shedding may not be voluntary, depending on the customer. Generally, the most likely customers to see significant benefit are commercial/industrial entities with significant load and/or distributed generation capacity like IT/telco, high power manufacturing facilities (with furnaces, presses, pumps, etc), medical facilities, and critical infrastructure facilities (water/sewer, etc).

In one exemplary embodiment, the end user may be a utility operator. Generally, the utility operator may desire a system that performs at least two main functions: 1) the ability to shed load, and 2) the ability to increase production. This system 10 may accommodate the first need by high speed, simultaneous communication to designated residential, commercial, and industrial loads and causing them to be removed from the power supply grid during grid stress conditions. The system 10 may accommodate the second need by high speed, simultaneous communication with available distributed generation systems causing them to be added to the supply grid to increase power production. Alternatively, the system 10 could cause the distributed generation system to island itself from the grid, thereby freeing load from the grid. Normally, anti-islanding policies and safety logistics would have to be worked out prior to implementation of this aspect of power control.

In another example, the system 10 may also function as a two-way communication tool between the grid operator and the customer. The customer provides positive feedback to the grid operator on actions taken and the grid operator provides information to the customer regarding grid status.

In order to accomplish the objective of stabilizing the grid, in one exemplary embodiment, the system 10 understands what to do with certain grid signals and takes appropriate actions based on those signals. In this embodiment, the tier level assigned to each device would be the highest level at which the device operates prior to being powered off if the grid stress causes escalation to the next tier. In one particular example, specific customer loads and their respective tier levels are discussed further in the schematic outline found in Addendum B.

Figure 7A:
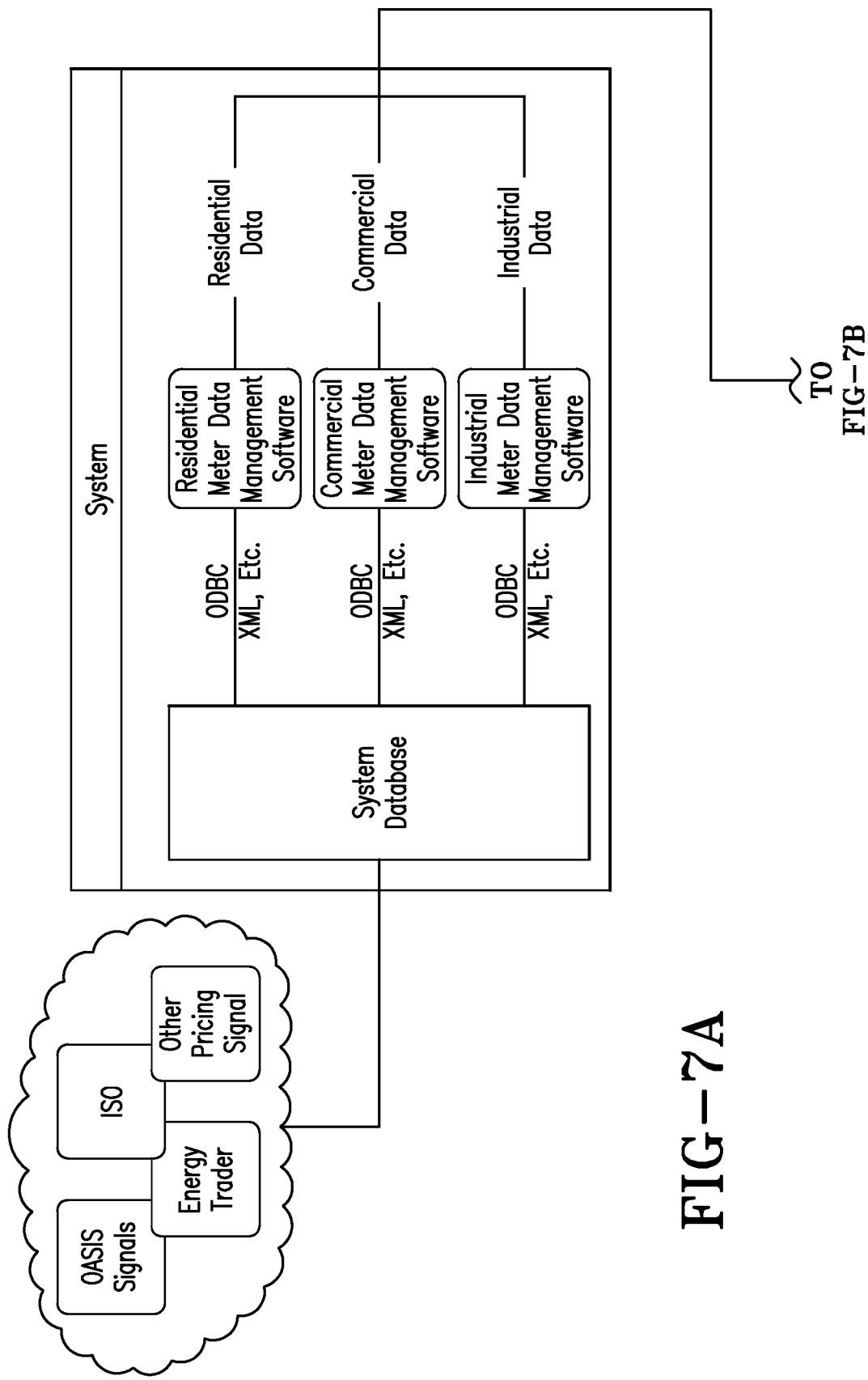
FIG. 7 illustrates one example of how the system may be set up to communicate with the smart meters.

In one example, the system 10 is capable of communicating with smart meters. FIG. 7 illustrates one example of how the system 10 may be set up to communicate with the smart meters. In some exemplary embodiments, the system 10 technology may not be a duplication of duties of conventional smart meters. Smart meters have the capability to send signals to smart thermostats which in turn can adjust heating/AC set points, and activate other external contacts to turn loads on or off. The system 10 may be a computer server that interprets pricing signals (and possibly other types of signals) from the utility provider. The system 10 has information stored, or is able to access the appropriate database to get information about each customer, and what to do with that customer under Tier 1 through Tier 5 conditions, in this example. It may be the utility and ISO's main tool for load shed control and distributed generation control.

An exemplary embodiment of the system 10 may be capable of communicating directly with other energy management systems and components such that all customer groups can properly manage their loads, and the utility energy traders and ISO's can properly manage the flow of energy.

Figure 8B:
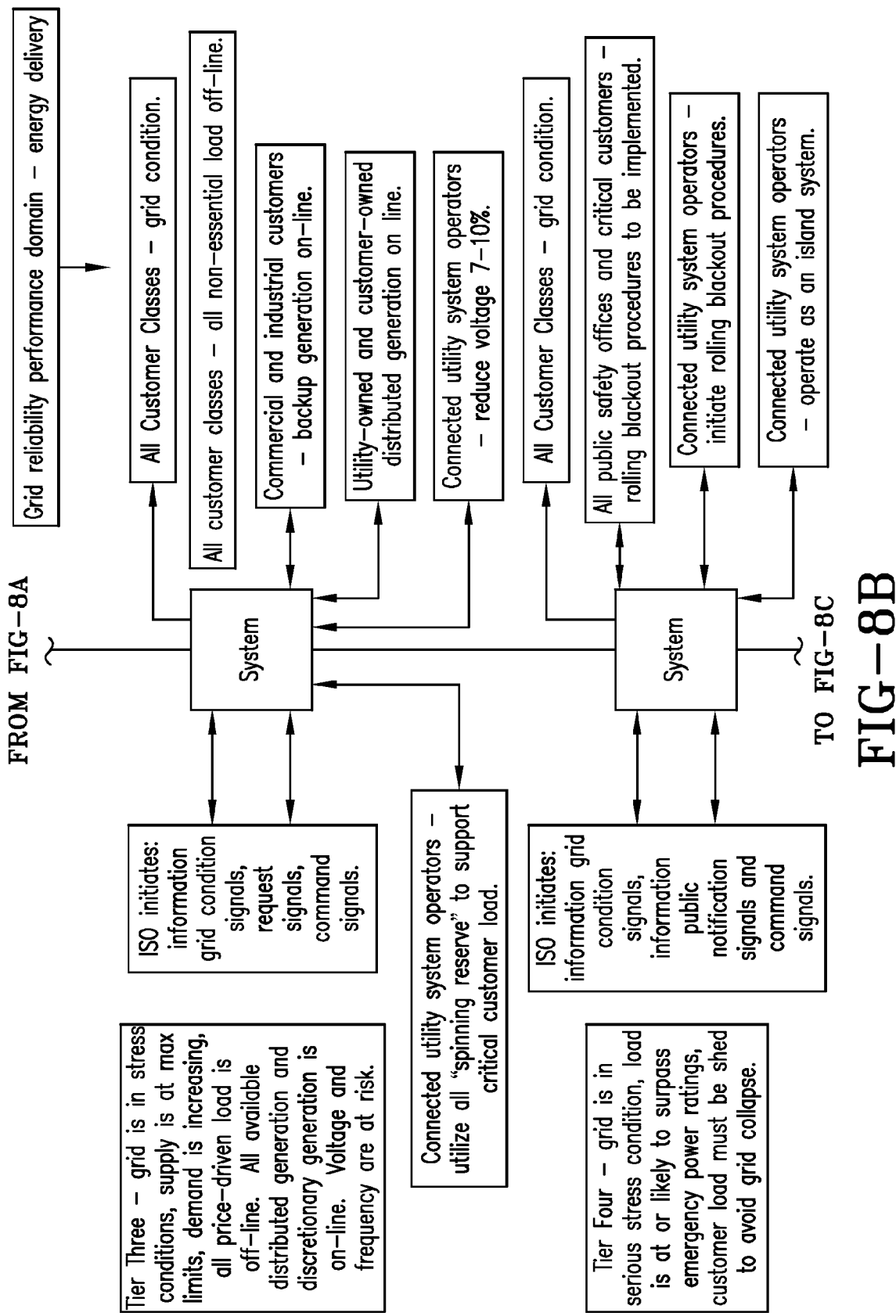
FIG. 8 illustrates an example of the specification requirements for one exemplary embodiment of the system.

FIG. 8 outlines the specification requirements for one exemplary embodiment of the system 10 that will link the communications signals from the energy traders and grid operators on the supply side to the customers on the demand side during response actions required to stabilize the grid under stress.

When using the system, in one exemplary embodiment, a smart meter may receive a signal and act according to the tier level. Also, in another embodiment, the pricing signal and tier status logic may be propagated to the database 100.

By moving the pricing signal and tier status logic the database gains stability, consistency, control, and reduces communication demands. Using the logic, meters that require change may be the only meters using the communication pathways. Additionally, less information may be required to pass to the meter because of the relational capabilities of the database. Transactions may be passed to the meter with unique record tags that are consequently returned with data read from the meter and merged with data that was processed at the send command.

Typically, not all smart meters will have the same communication protocols. However, drivers may be required to translate database commands and actions to standardized communication protocols. Therefore, in one exemplary embodiment, during the design of the database tables, they may be built to allow for the input of different references to names of the individual relay in the meter and the action value to be sent to the relay.

While certain embodiments of the present invention are described in detail above, the scope of the invention is not to be considered limited by such disclosure, and modifications are possible without departing from the spirit of the invention as evidenced by the following claims:

Addendum A

Schematic Diagram Outline in FIG. 7

I. Tier One (economic response)—grid is operating normally, system load demand is increasing and supply is approaching maximum available limits. Day-ahead or next-hour price is increasing. Energy prices are shown in "Time-of-Day" (TOD) rates.
  A. Energy Trader initiates price signal to customers through the system simultaneously to:
    1. Residential and small commercial customers
    2. Commercial and Industrial customers
  B. Customers have options to voluntarily reduce loads or to accept higher price supply consistent with their contracts with local distribution company (LDC). For example:
    1. Voluntary—manual override by customer
    2. Residential HVAC: thermostat set point changes X degrees for Y minutes/hours
    3. Residential Water heaters: cycling X minutes per hour
    4. Commercial HVAC (non-critical)
    5. Commercial Water heaters (non-critical)
    6. Industrial customers—"buy through" contracts
    7. Residential Washer/Dryers: prevention/delay of function
    8. Residential Dishwashers: prevention/delay of function
    9. Residential pool pumps: cycle X hours ON—Y hours OFF?
    10. Residential pool heaters: cycle X hours ON—Y hours OFF?
    11. Residential waterbed heaters: cycle X hours ON—Y hours OFF?
    12. Commercial pool heaters: cycle X hours ON—Y hours OFF?
    13. Residential coffee makers: prevention/delay of function
II. Tier Two (economic response)—grid is approaching stress conditions, all available generation supply is on line, interconnection points are transferring power at maximum levels and true prices are at maximum.
  A. Energy Trader initiates price signals through the system simultaneously to:
    1. Residential customers—mandatory load reduction
    2. Commercial and industrial "buy through" contracts
    3. Industrial customers "interruptible load" contracts
    4. Distributed generation customers—units on line for economic reasons
  B. Customer locations initiate the action steps as dictated by terms of their economic contracts with the LDC.
III. Tier Three (reliability control)—grid is in stress conditions, supply is at max limits, demand is increasing, all price-driven load is off-line, all price-driven load is off-line. All available distributed generation and discretionary generation are on-line. Voltage levels and frequency are at risk. Grid stability through economic pricing signals is not viable at this grid stress level—functional control is required
  A. ISO initiates a "level 3 stress" artificial price signal simultaneously to:
    1. Residential and small commercial customers—all load is blocked except for life support loads (similar to "rolling blackouts", but more selective)
    2. Commercial and industrial customers—only critical loads are supplied or loads are fed from on-site generation
    3. Utility-owned and customer-owned distributed generation—all commercial and industrial generation on-line and carrying load
IV. Tier 4 (reliability control)—grid is in serious stress conditions, demand is at or likely to surpass emergency power ratings, customer load must be shed to avoid wide-spread or cascading system collapse.
  A. ISO initiates a "level 4 stress" artificial price signal simultaneously to all customers having loads qualifying as critical loads—all non-qualifying loads are off-line
    1. Customer notified of possible rolling blackout so customer's system will initiate automated shutdown hardware/software if available
    2. Residential Power rolling ON/OFF (non-critical)

3. Commercial Power rolling ON/OFF (non-critical)

V. Tier 5 (reliability control)—grid is in severe stress conditions, all available power is reserved for public safety, critical customer groups and to sustain central generation facilities in "ready" or "startup' modes
  A. ISO initiates a "level 5 stress" artificial price signal to customers qualifying for service under national emergency designations and not able to support their loads with on-site generation facilities. For example:
    1. Residential Power OFF
    2. Commercial Power OFF
    3. Industrial Power OFF
    4. Only emergency services and critical loads allowed to be on, such as:
      a) Emergency wings in hospitals
      b) Police Stations
      c) Fire Stations
      d) Water supplies
      e) Waste Water Treatment
    5. All other customers only have distributed generation power, if any The Schematic Diagram contained in FIG. 7, is one exemplary embodiment of the system where five different energy levels are used. This exemplary embodiment is suitable to demonstrate the range of activities described in the Schematic Diagram.

Addendum B

Once Exemplary Embodiment of Software and Hardware (Note. Reference FIG. 8)

A. Energy Trader/ISO enters pricing signal from workstation keyboard
  1. A simulated pricing signal data stream interface that is consistent with information that is available to ET from the OASIS energy pricing database and which is modifiable to conform to grid stress levels. This signal is entered by the Energy Trader (ET) for response within the economic grid optimization domain.
  2. A simulated pricing signal data stream interface entered by the independent system operator (ISO) for response within the reliability grid optimization domain.
B. System receives pricing signal from ET/ISO and Initiates Action
  1. System recognizes price signal as a trigger to initiate action—design recognition protocol that differentiates between ET and ISO signals
  2. System will simulate the integration of a LDC customer data base to match contract customers to price signal—using results from preliminary investigation phase, design a prototype customer table to include a residential customer, a commercial customer and an industrial customer.
C. Action Table Generation: System matches customer groups with price signal received from ET/ISO
  1. System software accesses customers in prototype data base with contractual obligations to respond to pricing signal—System utilizes one residential blocking, one industrial customer to shed non-essential load and one commercial customer to start on-site generation.
  2. The software recognizes the three individual customer smart meter locations (one meter with three ID's) to create subset tables in preparation for sending message.
D. System sends action message to customer Smart Meter (SM)
  1. Uses an action message consistent with the price signal depicting the grid stress level with the action required at customer location—message is:
    a) residential—block load from turning on
    b) commercial—start on-site generation
    c) industrial—drop non-essential load segments
  2. Utilizing the information obtained during the preliminary investigation phase, the action message signals from system are compatible with smart meter chip protocol
  3. System software sends action messages to the SM simulated to represent three individual customer meters as noted above.
E. Smart meter receives action message signal from the system
  1. SM is programmed to initiate the actions called for in the three customers—the actual actions are represented as:
    a) residential—load blocked
    b) commercial—request for on-site generation received
    c) industrial—load dropped
F. Smart meter sends "acknowledge signal" back to system
  1. A message received/action initiated message occurs wherein the smart meter to transmits the message back to the system. This data transmission includes the customer meter ID number.
  2. This message is directed to the ET and ISO
G. System receives "acknowledge signal" from smart meter
  1. Memory stores discreet customer data in results table for later retrieval to confirm customers complied with contract provisions.
  2. Software in system transfers acknowledge signal from memory to ET and ISO in response to each of the two domains represented in the prototype test.
H. System sends results message to ET/ISO workstation
  1. Results message shows that the three customer contracts have been fulfilled:
    a) residential—load blocked
    b) commercial—on-site generation is on line
    c) industrial—load dropped
  2. Results message is transmitted to two workstations representing ET and ISO locations
I. Energy Trader/ISO enters all clear or return to normal message to system
  1. The all clear message (or "normal price signal") resets the system to normal status and resets the smart meter to normal status and halts or cancels the action initiated in response to the price signals
  2. A transfer protocol moves customer data from system memory to LDC customer records data base after completion of event.
  3. NOTE: This will be a staged "return to normal" scenario based upon the level of grid stress and the degree of relief accomplished. The objective of this feature is to "clear" the system in preparation for the next event and to restore the customers to a level of service consistent with the status of the grid condition.

What is claimed is:

1. A method for controlling energy consumption by energy consumers using a system for controlling energy consumption for energy consumers using smart meters, said method comprising the steps:

providing a computerized management system for controlling energy consumption for energy consumers using smart meters, said system comprising:
- a database that contains contract provisions for energy consumers;
- a database interface adapted to allow the system to access the contract provisions to optimize energy consumption based upon available energy;
- a data managing component adapted to manage data between the database and the smart meter; and
- a protocol converting component adapted to act as an interface for application programming or protocol converting;

matching a customer contract to an energy consumption signal in the system where the software product recognizes the smart meter location;

sending an action message to the customer smart meter from the system consistent with the energy consumption signal depicting an energy consumption level with the action required at the customer location;

sending an acknowledge signal that contains a customer data number back to the system from the customer smart meter;

receiving the acknowledge signal from the smart meter by the system;

sending a results message from the system to update the energy consumption signal.

2. The method of claim 1, wherein the action message to the customer smart meter induces the smart meter to perform at least one of the following: block an incoming energy load, require on-site energy generation, or drop an energy load.

3. The method of claim 1, further comprising the step of storing customer data in a results table to confirm the customer complied with customer contracts.

4. The method of claim 1, wherein there are five different energy consumption levels.

\* \* \* \* \*